United States Patent [19]

Roos

[11] Patent Number: 5,309,439
[45] Date of Patent: May 3, 1994

[54] TDMA SYSTEM WITH A VIRTUAL REFERENCE

[75] Inventor: David A. Roos, Boyds, Md.

[73] Assignee: Hughes Aircraft Company, Los Angeles, Calif.

[21] Appl. No.: 799,809

[22] Filed: Nov. 29, 1991

[51] Int. Cl.$^5$ ............................................. H04J 3/06
[52] U.S. Cl. ................................. 370/104.1; 370/95.3; 370/105.4
[58] Field of Search .................. 370/95.1, 95.3, 100.1, 370/104.1, 105.1, 105.5, 106, 103.4; 375/106, 107, 108, 111, 113; 455/12.1, 13.2; 342/82, 83, 88, 352, 356

[56] References Cited

U.S. PATENT DOCUMENTS

| | | | |
|---|---|---|---|
| 3,838,221 | 9/1974 | Schmidt et al. | 370/104.1 |
| 3,878,339 | 4/1975 | Maillet | 370/104.1 |
| 4,054,753 | 10/1977 | Kaul et al. | 370/95.3 |
| 4,107,608 | 8/1978 | Saburi | 370/104.1 |
| 4,262,356 | 4/1981 | Lautier et al. | 370/104.1 |
| 4,489,413 | 12/1984 | Richmond et al. | 370/30 |
| 4,561,099 | 12/1985 | Atsugi et al. | 370/104.1 |
| 4,574,379 | 3/1986 | Eng et al. | 370/104.1 |
| 4,630,267 | 12/1986 | Cortes et al. | 370/104.1 |
| 4,688,216 | 8/1987 | Saburi | 370/104.1 |
| 5,077,445 | 12/1991 | Nawata | 370/104.1 |

*Primary Examiner*—Douglas W. Olms
*Assistant Examiner*—Alpus H. Hsu
*Attorney, Agent, or Firm*—Gordon R. Lindeen, III; Wanda K. Denson-Low

[57] ABSTRACT

A TDMA system operates without the requirement for a reference burst. A station in the TDMA system monitors the bursts from other stations to determine the virtual reference. The virtual reference is then used as the basis, at the station, for transmitting its own burst. For carrier-based TDMA systems, the station can also determine a virtual carrier reference. This is implemented by measuring the received carrier from a plurality of bursts. The received carrier frequency of all of the bursts that have been received can then be averaged, and after correcting for frequency translation introduced by the transponder, the result can be employed as a virtual carrier reference.

22 Claims, 4 Drawing Sheets

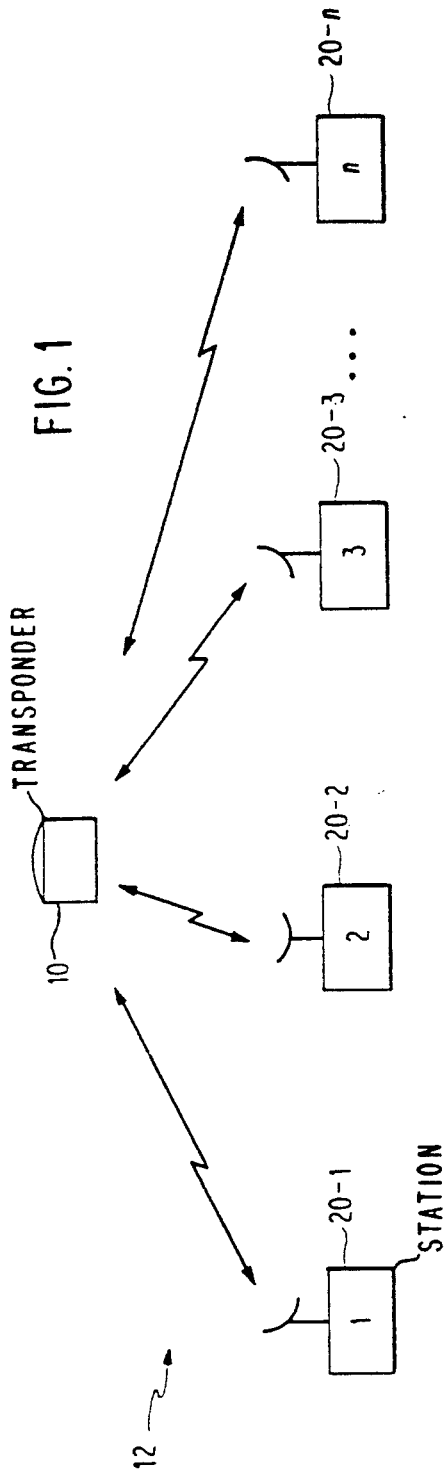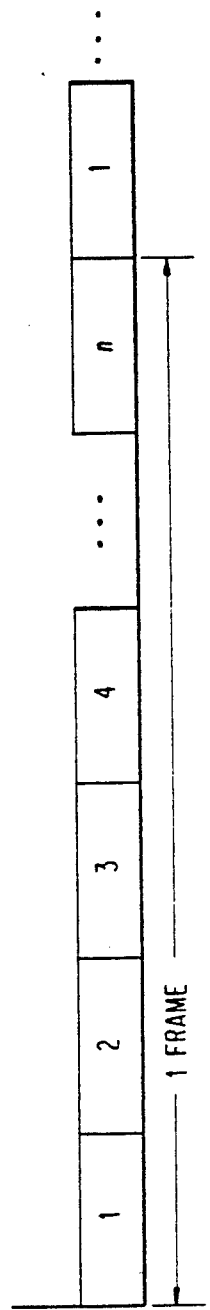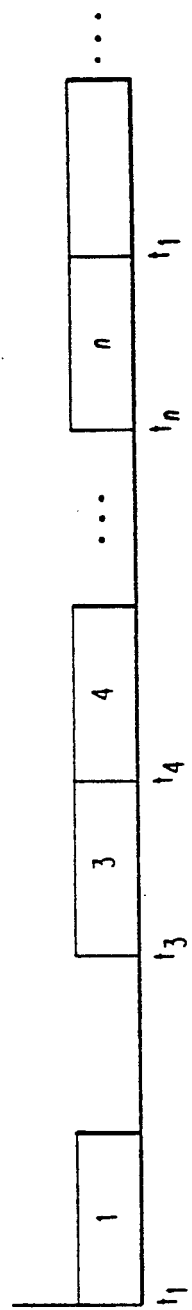
FIG. 1
FIG. 2A
FIG. 2B

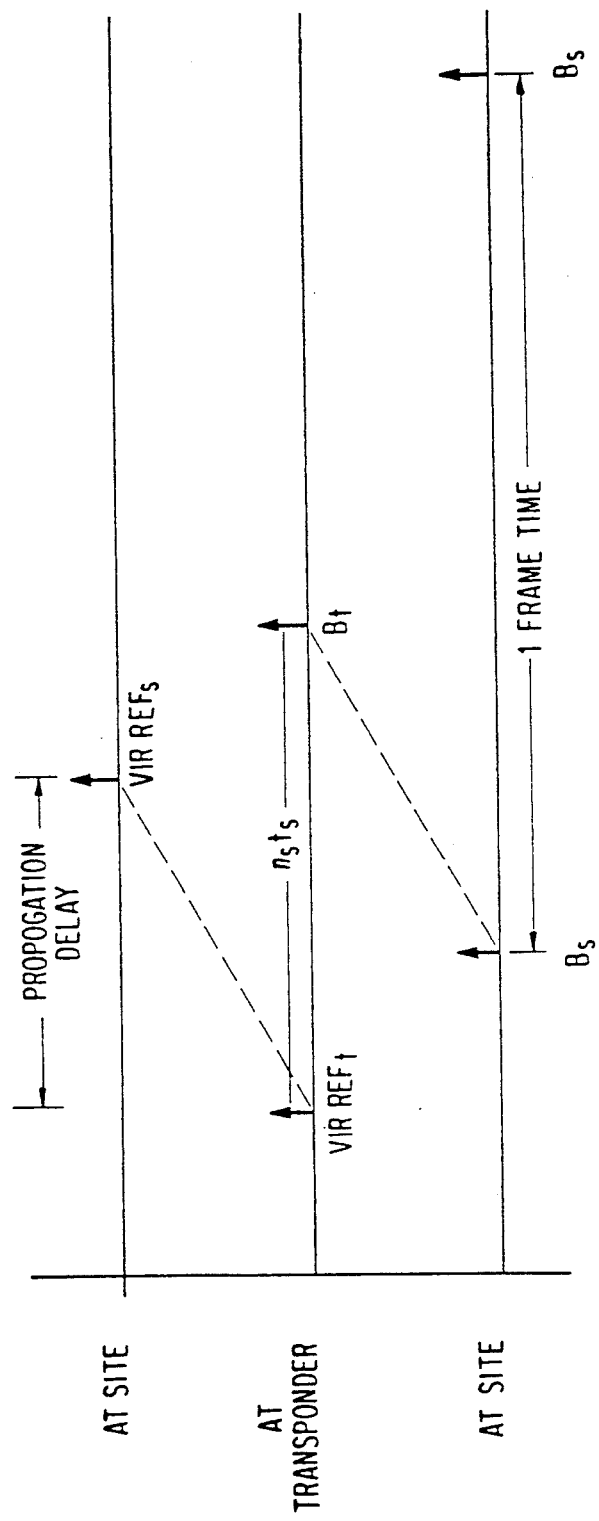

TDMA SYSTEM WITH A VIRTUAL REFERENCE

FIELD OF THE INVENTION

This invention relates to communications systems, and more particularly to implementing a virtual reference scheme in Time Division Multiple Access systems.

BACKGROUND ART

Time Division Multiple Access communications systems are widely used in the communications field because of their efficient use of available bandwidth. The key to TDMA operation is the necessity for each of the transmitting stations to transmit their respective burst transmissions in an appropriate time sequence so that the bursts appear sequentially at a repeater or common location in the system. Misalignment of the timing results in bursts which overlap to a lesser or greater extent. Overlap caused by improper timing can degrade the execution of the communication function. Early TDMA systems used a reference station, commonly identified to all of the stations in the network. A specified transmission burst of the reference station (whether or not it was a special reference burst), when received by the other stations, would be used for timing purposes. Because of the essential nature of the reference, in enabling the other stations to time their bursts, elaborate procedures were worked out in order to handle the condition in which the burst from the reference station was absent. (See, for example, U.S. Pat. No. 4,054,753 and the references cited therein.)

U.S. Pat. Nos. 4,262,356 and 4,630,267 appear to show how burst timing for one station can be implemented without a frame reference by merely timing from another burst in the frame. (U.S. Pat. No. 4,574,379 has some similarity in this regard.) The problem with this arrangement is that it does not take account of the timing of more than a single burst and as a result will insure the propagation of any timing error in the burst on which the timing is based. While both U.S. Pat. Nos. 4,262,356 and 4,630,267 mention timing based on all received bursts, the transmitting station's burst is based on the earliest transmit time indication of all the other bursts, see col. 4, lines 24-27 of U.S. Pat. No. 4,630,267 as well as col. 6, lines 7-14 and col. 9, lines 25-31 of U.S. Pat. No. 4,262,356.

Over and above the reference timing function, there is another synchronization requirement in TDMA networks which are carrier based. The synchronization function requires that each of the stations have a common estimate of the transmit carrier frequency.

In systems which use a reference station, each of the other stations can attempt to synchronize their own transmit carrier to their estimate of the reference station's transmit carrier frequency. In a system, such as to be described hereinafter, where there is no reference station, clearly some other procedure must be used so as to provide a station with information respecting an appropriate transmit carrier frequency. U.S. Pat. No. 4,489,413 proposes a system for synchronizing transmit carrier frequencies in a TDMA/TDM system. However, in the system described in U.S. Pat. No. 4,489,413, the stations receive a TDM (not a TDMA) signal from a central source. In contrast to U.S. Pat. No. 4,489,413, a typical TDMA system directs a frame of bursts from a geosynchronous satellite to each of the stations. Each burst in the frame may have originated from a different station and while each of those stations is nominally operating on an identical transmit carrier frequency, account must be taken of the fact that the frequencies will, of necessity, differ. This variation in transmit carrier frequencies is maintained inasmuch as the satellite transponder merely translates each of the bursts it receives by a fixed frequency offset. As a result, any differences between transmit carrier frequencies at the different transmitting stations is reflected in the carrier frequency of the bursts received by the stations. Thus the arrangement described in U.S. Pat. No. 4,489,413 does not resolve the problem of identifying an appropriate carrier frequency in a TDMA system.

SUMMARY OF THE INVENTION

Accordingly, it is an object of the present invention to provide for TDMA timing functions without the disadvantages evidenced by those systems which designate a common reference station.

It is another object of the present invention to provide a virtual TDMA reference which eliminates altogether the necessity for dedicating bandwidth for supporting the timing function and at the same time simplifies and therefore minimizes the processing required to support the timing function.

More particularly, in accordance with the present invention, the TDMA timing at any station in the network is derived from a virtual reference which is computed by merely detecting the bursts from other stations in the network.

Furthermore, in accordance with the present invention, the TDMA transmit carrier frequency at any station in the network is derived from a virtual reference which is computed by detecting the different carrier frequencies of the bursts in a frame.

Thus, in accordance with the invention, a virtual reference with respect to the TDMA timing and carrier frequency is constructed from the bursts which the station can hear (that is, receive transmission from). With regard to timing information, the virtual reference is a function of the received burst location within the frame for all bursts which are actually received. With regard to frequency synchronization, the virtual reference is a function of the received burst frequencies as well as the nominal frequency of the station. The present invention overcomes the limitation that the frequency of a station cannot be extended beyond a predetermined limit, by taking into account the nominal frequency of the station and allowing the virtual reference to converge to a frequency within the limits of the frequency tuning range of the station.

As an example, a station attempting to enter an existing network performs the following steps:

(1) Without transmitting, the entering station searches the channel for bursts from other stations;

(2) The entering station examines the locations of the bursts in time (this can be simply effected by detecting the location of a unique word typically included within each burst) and (at least for carrier based channels) also examines the received carrier frequencies;

(3) The entering station then computes a virtual reference. The virtual reference includes a virtual carrier frequency and a virtual TDMA reference. The carrier frequency can be determined by a procedure as simple as averaging the detected carrier frequencies. Likewise, the locations of the various unique words can also be averaged within the receive aperture. Alternatively, more complex functions can be implemented based on additional information such as a timing plan, etc.;

(4) Based on this virtual reference, the entering station begins transmitting in that station's designated slot. Note that for certain protocols such as slotted ALOHA or reservation based systems, the designated slot can be any random vacant slot;

(5) Having begun transmitting, the entering station can then monitor the location of its burst in the frame so as to alter the transmit timing in order to bring the location of the unique word detection to the nominal center of the aperture;

(6) The entering station then tracks the virtual reference for each frame and preferably applies a smoothing operation to prevent the virtual reference from jumping around too much. Using the smoothing operation, transmit timing is adjusted to maintain the location of the unique word at the nominal center of the aperture;

The foregoing procedure will work regardless of the number of stations in the system so long as there is no subset of the set of stations $\{S(0), S(1), S(2), \ldots S(n)\}$, such that all of the members of the subset can neither hear nor be heard by any member not in the subset. In other words, if station A can hear station B and station B can hear station C, but station A cannot hear station C directly, the network will nevertheless, using this procedure, achieve synchronization because A can hear C indirectly, that is, via station B. If on the other hand, A can hear B but neither A nor B can hear C or D, then the network can be considered segmented and cannot be synchronized by any method.

BRIEF DESCRIPTION OF THE DRAWINGS

The present invention will now be described so as to enable those skilled in the art to make and use the same in the following portions of this specification when taken in conjunction with the attached drawings, in which:

FIGS. 1, 4 and 5 illustrate varieties of TDMA systems within which the invention can be used;

FIGS. 2A and 2B illustrate a typical TDMA frame;

FIG. 7 shows how a site, intending to transmit, uses VIR REF in order to determine its own burst start time $B_s$.

DETAILED DESCRIPTION OF PREFERRED EMBODIMENT

Figure 3:
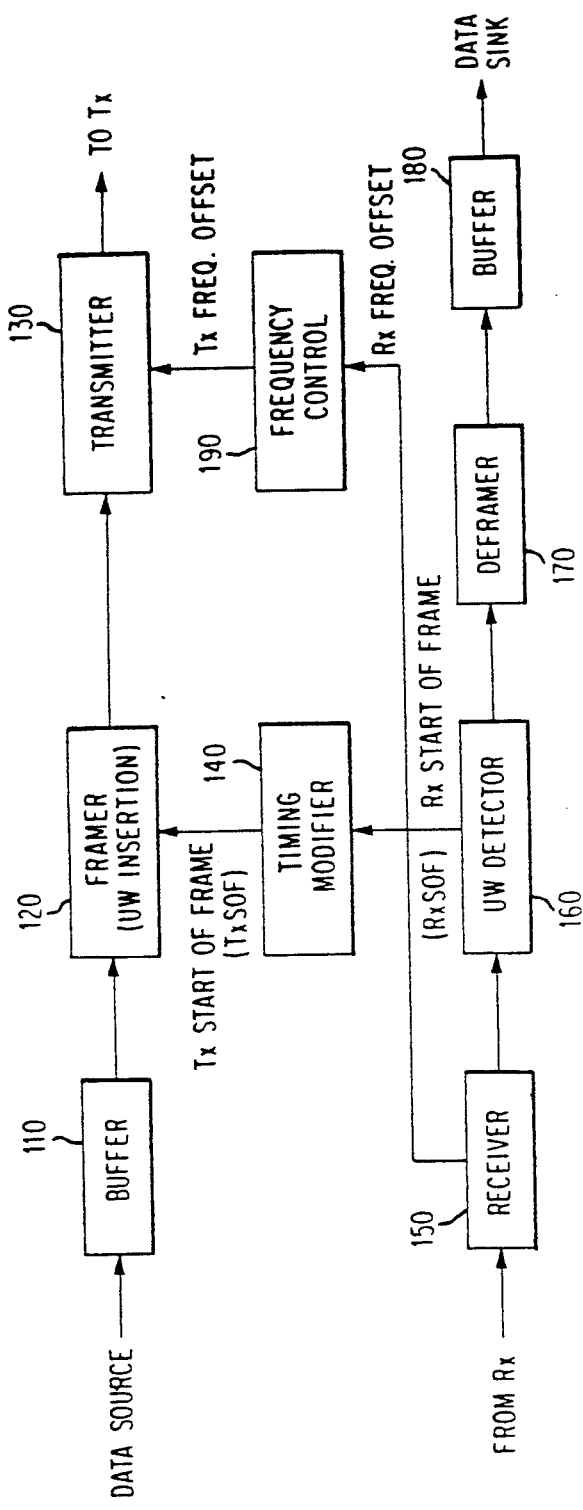
FIG. 3 is a block diagram of a typical TDMA terminal or station.

FIG. 1 illustrates a typical TDMA system 12 when used with a geostationary satellite which carries a transponder 10. Communication is implemented in the system 12 as shown in FIG. 1, wherein each of the stations 20-1 through 20-n transmit on a (nominally) common transmit frequency and likewise receive on a (nominally) common receive frequency. The transponder 10 effects a frequency translation, receiving on the common transmit frequency and transmitting on the common receive frequency. Time Division Multiple Access (TDMA) is implemented by arranging the transmissions from each of the stations in a burst form and then timing those bursts so that when they reach the transponder 10, they interleave in time. In the prior art, a frame format is defined as existing between periodic repetitions of a frame marker. In some cases, the frame marker can be a dedicated sync burst which is transmitted by a reference station to serve that purpose. In other systems, the frame marker consists of the beginning of a burst from a station which has been designated the reference station. The data traffic located between sequential instances of the reference marker is a frame. FIG. 2A shows a typical frame as consisting of bursts from the various stations. In some systems, each station sends a burst in every frame; in other systems, the existence of a station's burst is dependent on whether the station has data traffic available for transmission. The number of bursts transmitted by a station within a frame is also variable, i.e. it may be greater than 1. The location of a station's burst in a frame is, however, determined by that station's receipt of the reference marker. For example, the initiation of a burst 2 from station 20-2 must be delayed from the reference marker (in time) by a quantity which is related to the duration of the first reference burst. Typically, each burst has an initial portion dedicated to a Unique Word (UW). Detection of the UW then defines the initiation of any particular burst. Typically, either the UW or some other portion of the burst will identify the station which is transmitting. In some systems, correlation between stations and burst location in the frame is preassigned, either permanently or semi-permanently. Under these circumstances, each station will be aware of the effective burst assignment prior to attempting to initiate its own transmission. In other systems, there is no assignment at all, i.e. the system operates on a random assignment basis, such as ALOHA.

FIG. 2B illustrates a frame in which the burst in the second time slot $t_2$ is not present. The application of the invention to a station which has access to the second slot in the frame will be described. In order to transmit, the station must locate its burst within that slot. In a typical prior art system, wherein the frame included a reference marker, timing the transmission is implemented merely by locating the reference marker and then timing the transmission relative to that reference marker, based on the desired slot position in the frame. In accordance with the present invention there is, however, no reference marker.

In accordance with the invention, the entering station which is to access slot $t_2$ first searches for the bursts from other stations. The entering station will generate a virtual marker for use in timing its own transmission by examining the locations of the bursts which have been received from other stations. The burst location which is received from other stations can be defined relative to the unique word location in each burst.

Figure 6:
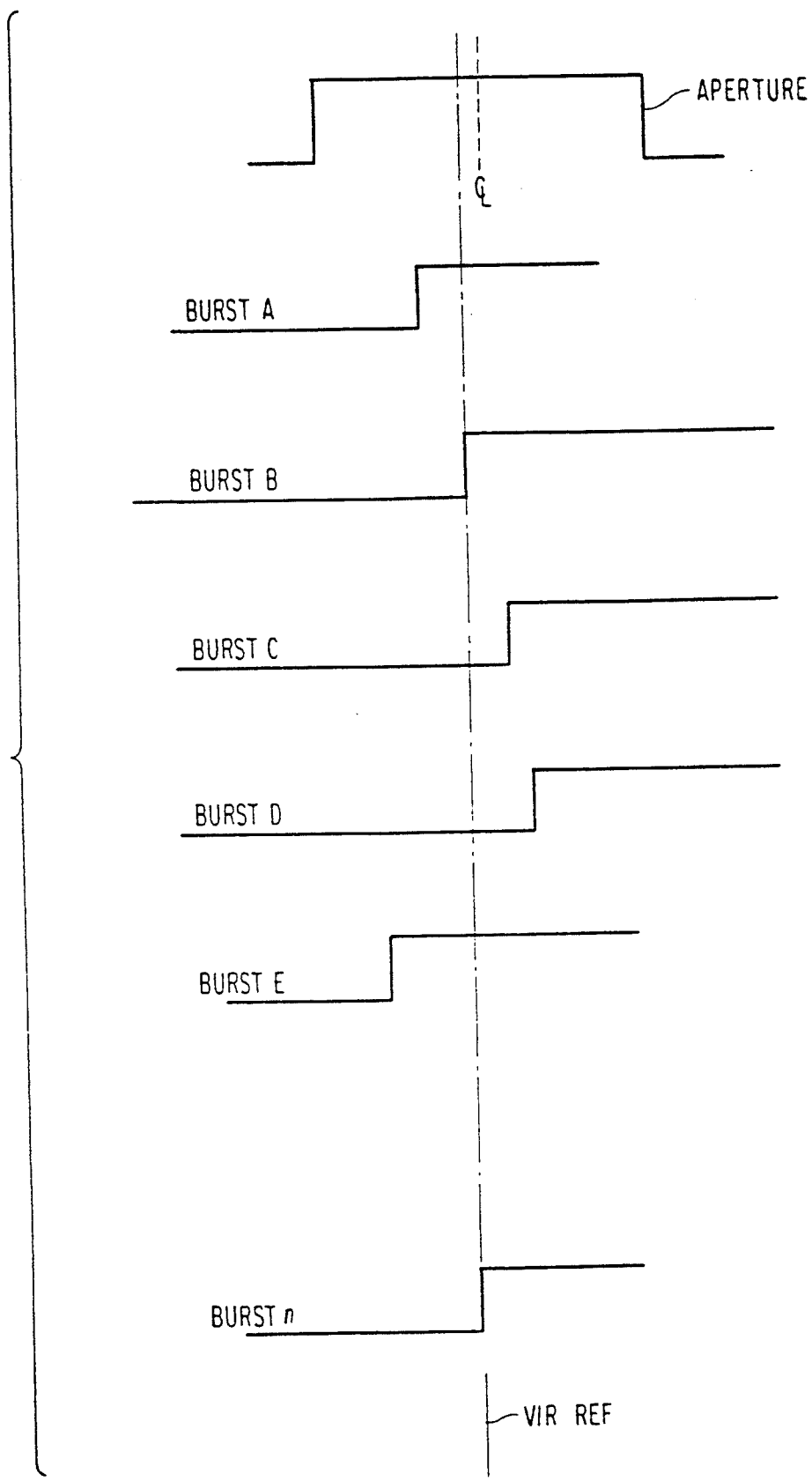
FIG. 6 illustrates the creation of an aperture and the measurement, based on an aperture of burst locations of various different bursts in a TDMA frame, in order to create a VIR REF.

FIG. 6 shows the measurement of burst location for several bursts, e.g. bursts A, B, C, D, E, ... n. A station desiring to initiate transmission first detects the existence of a burst. Based on that detection, an aperture is created (such as the APERTURE) shown in FIG. 6. The station then measures the burst location of each of a successive number of bursts relative to a nominal center line of the APERTURE. FIG. 6 shows that the location of the initiation of bursts A, B, C, D, E, ... n have been measured relative to the nominal center line $CL_N$. Averaging these values produces a location for VIR REF, the virtual reference. In order to measure the location of successive bursts, the aperture which is created based on detection of one burst is repeated at the appropriate rate. Having averaged the burst location to establish VIR REF, the station can then locate its own burst relative to VIR REF. This is illustrated in FIG. 7.

FIG. 7 shows the location of VIR REF$_s$ (the location of VIR REF measured at the site). Advancing VIR REF in time by the duration of the propagation delay establishes the location of VIR REF$_t$ (at the transponder 10). Then, delaying the VIR REF$_t$ by a time consumed between VIR REF and initiation of the station's own transmission (which is equal to $n_s \cdot t_s$, the product of the number ($n_s$) of slots ($t_1$-$t_n$) between Start of Frame, SOF, and the start of the site's burst, and the duration $t_s$ of each slot provides an estimate of the appropriate time $B_t$ for the station's burst at the transponder. Advancing this estimate ($B_t$), in time, by the propagation delay establishes the appropriate time, $B_s$ at the site, to initiate the station's own burst. This time ($B_s$) can then be advanced by a frame time, or several frame times, so as to compute a time in the future which would be appropriate for the station's burst.

Having determined an appropriate time for the station's own transmission, based on the virtual reference, the station can then transmit at the appropriate time. Typically, this transmission will be a shortened burst, and the burst may even be delayed from the calculated appropriate time $B_s$ so as to avoid interfering with other bursts in case of error. Having transmitted this trial burst, the station can monitor the position of the trial burst relative to the rest of the frame.

The apparatus for performing this operation is shown in FIG. 3, as it would preferably be configured for utilization. FIG. 3 shows the apparatus at a typical ground station (not shown). Data which is available for transmission is input to a buffer 110. The buffer 110 in turn drives a framer 120. The output of the framer 120 is provided to a transmitter 130, whose output in turn is coupled to the remaining portion of the transmit chain. In order to establish the appropriate time to initiate transmission, a receiver 150 monitors transmissions from the transponder 10. One output of the receiver 150 is provided to a unique word detector 160. The unique word detector 160 signals the timing modifier 140 on detection of each unique word. The timing modifier 140 performs the functions shown in FIGS. 6 and 7. More particularly, upon receipt of a unique word, the timing modifier 140 creates an aperture, and then measures a succession of unique word locations relative to a nominal centerline, $CL_N$, of the aperture (APERTURE), in order to establish a virtual reference (VIR REF). The virtual reference (VIR REF) is then modified as shown in FIG. 7 based on the position within the frame of the station's slot, and at the appropriate time, the timing modifier 140 signals the framer 120 to insert the station's unique word and output data for transmission.

Having initially derived a virtual reference marker, as described, and transmitted a trial burst, the station can then maintain its burst at the appropriate location in the frame in a similar fashion except that the station of course no longer need transmit a trial burst. More particularly, the station continues to monitor the location of the bursts within the frame (including its own) in order to determine a virtual reference and then, based on that virtual reference, timing its own burst. In this steady state operation, the station can also employ smoothing in an attempt to minimize timing errors caused by false detection or misdetection of a unique word. This smoothing can be as simple as a 1-tap digital filter wherein the present unique word detection location is averaged with the last virtual reference marker, with the location of the virtual reference marker weighted more heavily than the present unique word detection. Alternatively, a more complicated predictor can be used that attempts to estimate the location of the present unique word based on previous bursts from that station and then uses the actual unique word detection location to update the prediction for the next burst. Further elaboration of the various smoothing type mechanisms that can be employed is not necessary to a description of the present invention since many smoothing techniques are well-known in the art.

The foregoing has described how a station operating in the TDMA system without a reference station can establish a virtual reference based on the transmissions of other stations and initiate its own transmission.

Another important consideration in a TDMA system operating without a reference station is the transmit carrier frequency itself. Using the principles of the present invention, a station can also establish a virtual carrier frequency reference, based on the carrier frequencies detected in the transmissions of other stations. Using this virtual carrier frequency, the frequency control element 190 provides a transmit frequency offset signal to the transmitter 130 for establishing the transmit carrier frequency for the station.

More particularly, the receiver 150 may be a conventional receiver which, in the course of receiving a signal, creates a local signal whose frequency and phase match the frequency and phase of the received signal's carrier. The receiver 150 monitors the accuracy of its estimate of the received carrier (in frequency and phase) by mixing the two signals together, low pass filtering the result, slicing the low pass filtered signal, recovering the clock information within the sliced signal and then resampling with the recovered clock. Accordingly, the locally generated signal is an accurate estimate of the received carrier (in phase and frequency). Thus, the receiver 150 can determine the receive frequency offset, i.e. the amount by which the received carrier frequency differs from the nominal received carrier frequency. This received frequency offset is then employed in the frequency control 190. For example, the receive frequency offset from a number of bursts can be averaged or otherwise mathematically combined to generate an average receive frequency offset. This average receive frequency offset can then be used in the frequency control 190 to generate an appropriate transmit frequency offset. The transmitter 130 then employs the transmit frequency offset provided by the frequency control 190 to generate the transmit carrier frequency for the station. In this fashion then, the station generates its own estimate of a virtual carrier frequency and employs that virtual carrier frequency for transmission purposes.

The carrier frequency estimation process can be improved by taking into account the station's nominal carrier frequency. If a station updates its carrier frequency based solely on receptions from other stations, and if the channel is introducing unknown frequency offsets (as in a satellite or mobile channel due to doppler), then it is clear that each station's estimate of the other carrier frequencies are corrupted by the unknown frequency offset. Including information about the station's own nominal frequency serves as a bias against this type of error. For example, rather than merely averaging the received frequencies (adjusting for any necessary frequency offset), each station estimates the average of the nominal carrier frequencies of all stations rather than the average of the actual received frequencies. For example, each station measures the carrier frequencies of the other stations and averages those measurements with its own nominal carrier frequency and adjusts its own carrier frequency to that average. Even in this raechanism, a longer term average or smoothing operation is appropriate to mitigate the effects of measurement errors. Under these circumstances, even though the measurements may be corrupted by frequency offsets in the channel, the result will not wander too far from the nominal frequency. A further refinement in this mechanism attempts to estimate the amount of channel frequency offset and then correct all frequency measurements by this amount. This makes the resulting frequency averages much closer to the ideal because much of the unknown error can be removed. For example, each station measures the difference between its own receive frequency and its transmit frequency (corrected for any nominal channel frequency offset or frequency translation at the transponder). This difference is an estimate of the channel frequency offset. The estimate may then be refined by time averaging or other means. Using this estimate of the channel frequency offset, the received frequency is corrected by this frequency offset so that the result of the station's computation produces a virtual carrier frequency which has much of the channel frequency offset removed.

This can be expressed as follows. Assuming the measured receive frequencies are $f_{R1}, f_{R2}, \ldots f_{R3}$ and the station's measurement of the carrier frequency of its own burst is $f_{R0}$. The station can make its own estimate of the channel induced frequency translation as follows:

$$\delta f_{channel} = f_{T0} - f_{R0} \pm FT$$

where:

$f_{T0}$ = the station's transmit carrier frequency,
$FT$ = the transponder frequency translation,
$\delta f_{channel}$ = the channel induced frequency translation,
where the sign of FT which is employed depends upon the direction of the frequency translation at the transponder. Having determined the channel induced frequency translation $\delta f_{channel}$, each received carrier frequency can be corrected as follows:

$$f_{R1C} = f_{R1} - \delta f_{channel}$$

where $f_{R1C}$ is the corrected receive frequency.

Using this procedure to correct for the channel induced frequency translation, a virtual transmit frequency is determined as a function of $(f_{R1C} + f_{R2C} \ldots f_{RnC}) \pm FT$, wherein the function itself can be a simple average or a more complicated procedure.

Figure 5:
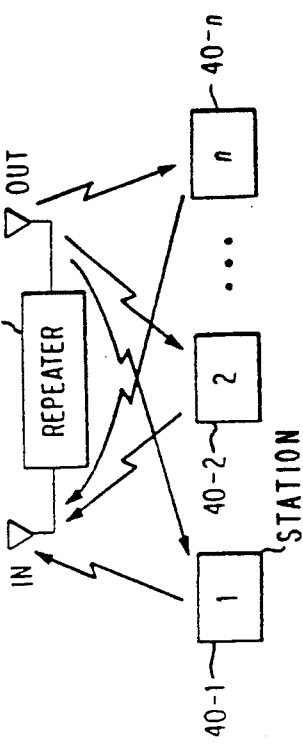
Figure 4:
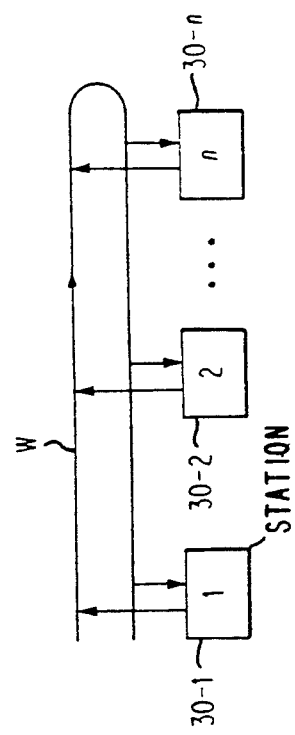

The foregoing has described an application of the present invention to carrier based TDMA systems using a geostationary transponder. FIGS. 4 and 5 show other applications of TDMA systems which can also employ the present invention. More particularly, FIG. 4 shows that a plurality of stations 30-1 through 30-n engage in TDMA communications over a cable W. Signals travel over the cable W in a single direction. Those signals can either be baseband or modulated on a carrier. Those skilled in the art will understand how the system of FIG. 4 is an analog of the system shown in FIG. 1 so that the teachings of the present invention can be used to allow each of the stations to use a virtual reference (both for transmit timing as well as carrier frequency, if necessary) as described hereinabove.

FIG. 5 is another TDMA system using signals modulated on a carrier for allowing TDMA communications among stations 40-1 through 40-n. The repeater 45 shown in FIG. 5 includes a frequency translating transponder, but the repeater 45 is not necessarily located in a geosynchronous orbit. Thus, the repeater 45 can be another ground-based station and/or a mobile station (airborne or vehicle-carried).

It should be apparent from the foregoing that a TDMA system has been described which does not require the services of a reference station, either for TDMA timing or for carrier frequency synchronization. It should also be apparent to those skilled in the art that many changes can be made to the particular embodiment described herein. For example, while locating a burst by detecting the location of a unique word in or near the burst preamble is conventional in the art, in fact a burst can be located by detection of a unique word anywhere within the burst, assuming the location of the unique word within the burst is predetermined. These and other changes can be made without departing spirit or scope of the present invention, which is not to be limited by the specific embodiment described herein, but rather is to be construed in accordance with the claims appended hereto.

I claim:

1. A method of timing the transmission of a burst from a transmitting station in a TDMA system comprising the steps of:
   a) detecting bursts located in a TDMA frame received at the transmitting station;
   b) monitoring the locations in said received bursts of unique words contained in said received bursts;
   c) deriving, in response to said monitoring step, a virtual frame reference; and,
   d) timing the transmission of at least one burst transmitted from the transmitting station based on the virtual frame reference derived in said deriving step.

2. The method of claim 1 in which said deriving step (c) comprises averaging the monitored locations of the received bursts.

3. The method of claim 1 or 2 in which said monitoring step (b) comprises monitoring the location of each received burst of a frame.

4. The method of claim 1 in which said monitoring step (b) includes:
   (b1) creating an aperture having a centerline based on one of said received bursts; and
   (b2) measuring the locations of said unique words relative to the aperture centerline.

5. The method of claim 1 in which said timing step (d) includes:
   (d1) transmitting a trial burst having a shortened duration in a first frame; and
   (d2) transmitting a full burst having a longer duration than the trial burst in a succeeding frame.

6. The method of claim 5 further including:
   (e) measuring the location of said trial burst in a TDMA frame as it is received at the transmitting station; and
   (f) adjusting the timing of said full burst in response to the measurement.

7. The method of claim 6 in which said adjusting step (f) includes averaging the measured location of the trial burst with the virtual frame reference.

8. The method of claim 1 further including:
(e) repeating said detecting (a), monitoring (b) and deriving (c) steps;
(f) changing the timing of burst transmissions based on the virtual reference derived in said repeated deriving step.

9. The method of claim 8 in which said changing step (h) includes smoothing the change in the timing.

10. A method of synchronizing a carrier frequency of a transmitting station in a TDMA system comprising the steps of:
a) detecting, at said transmitting station, received bursts in a TDMA frame, each burst having a carrier frequency;
b) monitoring the carrier frequencies of the received bursts;
c) deriving, in response to said monitoring step, a virtual carrier frequency reference; and,
d) transmitting, from the transmitting station, at least one burst with a carrier frequency based on said virtual carrier frequency reference.

11. The method of claim 10 in which said deriving step (c) comprises averaging the carrier frequencies of the monitored received bursts.

12. The method of claim 10 or 11 in which said monitoring step (b) includes monitoring the carrier frequency of each received burst of a frame.

13. The method of claim 10 in which said deriving step (c) includes:
(c1) estimating a channel frequency offset,
(c2) correcting monitored carrier frequencies by the channel frequency offset, and
(c3) using corrected monitored carrier frequencies for deriving said virtual carrier frequency reference.

14. The method of claim 10 in which said estimating step (c1) comprises:
(c11) transmitting a burst at a known carrier frequency from the transmitting station, measuring the carrier frequency of the transmitted burst as received by the transmitting station, and
(c12) obtaining a difference between the carrier frequency measured upon receipt and the transmitting station's transmit carrier frequency in order to estimate the channel frequency offset.

15. The method of claim 11 in which said deriving step (c) includes averaging the carrier frequencies of the monitored received bursts with the transmitting station's carrier frequency.

16. Apparatus for timing a transmission of a burst from a transmitting station in a TDMA system, comprising:
(a) means for detecting bursts located in a TDMA frame received at the transmitting station;
(b) means for monitoring the location in said received bursts of unique words contained in said received bursts;
(c) means for deriving, from the monitoring means, a virtual frame reference; and
(d) means for transmitting from the transmitting station at least one burst based on the virtual frame reference produced by said means for deriving.

17. The apparatus of claim 16 in which said means for deriving includes means for averaging the location of received bursts.

18. The apparatus of claim 16 or claim 17 in which said means for monitoring monitors the location of all received bursts of a frame.

19. Apparatus for synchronizing a carrier frequency of a transmitting station in a TDMA system comprising:
(a) means at the transmitting station for detecting received bursts in a TDMA frame, each burst having a carrier frequency;
(b) means for monitoring the carrier frequencies of the received bursts;
(c) means for deriving from the monitoring means a virtual carrier frequency reference; and
(d) means for transmitting from the transmitting station at least one burst with a carrier frequency based on said virtual carrier frequency reference.

20. The apparatus of claim 19 in which said means for deriving includes means for averaging the carrier frequencies of the received bursts.

21. The apparatus of claims 19 or 20 in which said means for monitoring monitors the carrier frequency of each received burst of a frame.

22. The apparatus of claim 12 in which said means for deriving includes:
means for estimating a channel frequency offset;
means for correcting monitored carrier frequencies by the channel frequency offset; and
means for using collected monitored carrier frequencies for deriving said virtual carrier frequency reference.

* * * * *